United States Patent Office 3,743,718
Patented July 3, 1973

3,743,718
**METHOD OF ATTRACTING AND TRAPPING MALE MOTHS OF THE SPECIES *PARALOBESIA VITEANA***
Andre Comeau, Richmond, Quebec, Canada, and Wendell Roelofs and James Tette, Geneva, and Emil Frederick Taschenberg, Fredonia, N.Y., assignors to Research Corporation, New York, N.Y.
No Drawing. Filed Feb. 22, 1971, Ser. No. 117,788
Int. Cl. A01n *17/14, 17/00*
U.S. Cl. 424—84
10 Claims

ABSTRACT OF THE DISCLOSURE

It has been found that cis-9-dodecenyl acetate attracts certain moths of the sub-family olethreutinae in particular the grape-berry moth, *Paralobesia viteana*. The insertion of the cis-9-dodecenyl acetate in a trap constructed to vaporize the said compound provides a means for attracting, trapping and destroying said moths without damage to the general environment. It has further been found that the addition of $C_8$–$C_{12}$ alkyl, alkenyl or alkynyl acetates to the trap permits the use of far higher concentrations of the dodecenyl acetate than would be possible otherwise. Hence, permitting the attraction of the moth from a very wide area.

FIELD OF THE INVENTION

Attractive insect trapping.

DESCRIPTION OF THE PRIOR ART

In recent years, the ecological problems raised by the wide-spread use of certain insecticides, in particular halogenated aromatics such as DDT, have initiated the search for more specific methods of destroying insect pests, which, if they do not entirely eliminate the use of such harmful insecticides as pesticides, at least considerably cut down the area in which they are broadcast. One mode which has been found of great interest in recent years has been the use of sex attractants or pheromones to attract either the male or the female of a particular species or a number of species to a particular and small location where they can be destroyed thereby interrupting the breeding cycle and cutting down the number of such pests in the next season. One technique employed for this purpose is to isolate either the male or the female pheromone and insert it into an insect trap which is then located in the area which it is desired to protect from a particular species of moth or other insect. The vapor from the trap attracts the insects into the trap where they are either held or killed, thus removing them from the general populace. Two problems have been associated with this approach. The first problem is that of availability. Enormous numbers of laboratory reared insects are required to produce the naturally occurring attractant. This clearly is not a commercially feasible approach and therefore the nature of the attractant must be determined and the attractant prepared synthetically.

The second problem is that of concentration of the attractant. If the concentration in the trap is too low, the vapor therefrom is noticed over too small an area and an insufficient number of the desired insects are attracted thereby. On the other hand, if the concentration in the trap is high enough to cause the vapor to be noted at a large distance from the trap, the strength of the vapor close to the trap becomes so high that it acts as a repellent when the insects approach the trap and the desired effect is not produced. A similar phenomenon is noted in the art of perfumery. Extracts of civet is an extremely desirable ingredient in perfumes in very small amounts giving body to them, the same is true of extract of musk. However both of these odorants are extremely respulsive in high concentrations. It is therefore not surprising that a similar effect would be noted in the insect world. Thus, it is desirable to find a carrier for the attractant which permits the broadcast of the attractant at a large distance from the trap and yet somehow masks the high concentration at the locus of the trap so that the attracted insects are not repelled at the critical point.

The presence of a sex pheromone in *Paralobesia viteana* was reported by Roelofs and Feng (Ann. Entomol. Soc. Amer. 61, 312–316 (1968), and in *Polychrosis botarana*, a very closely related species by Gotz (Z. angew. Entomol. 26, 143–165). Both of these species are moths which feed on the grape-berry. The first of these *P. viteana* is a pest of the vine in the Eastern United States and is particularly harmful pest in New York State vineyards. *P. botrana* is similarly a grape-berry pest which is found in Europe. *P. viteana* females have been reared by Taschenberg (Ann. Entomol. Soc. Amer. 62, 1374–1378) to provide a source of the male attracting pheromone.

Heretofore, the chemical structure of the male attracting pheromone of *P. viteana* has been unknown.

SUMMARY OF THE INVENTION

A male attracting sex pheromone which is active towards males of the species *P. viteana* has been isolated and identified as to its chemical structure, namely cis-9-dodecenyl acetate.

Cis-9-dodecenyl acetate has been synthesized, and the synthetic material found to be active as a male attracting pheromone for *P. viteana* as measured both by electroantennogram measurements and by field trapping tests.

It has been found that the pheromone is active in attracting males when dispensed at a level of between 10 to 30 micrograms per trap. However, at this level the effective radius of the pheromone is not great.

It has been found that when $C_8$–$C_{12}$ alkyl, alkenyl or alkynyl acetates were added to cis-9-dodecenyl acetate, the amount of attractant in the trap could be raised to 100 micrograms without repellent effect, and the increase in catch of the moths was ca. 2,000%.

DESCRIPTION OF THE PREFERRED EMBODIMENTS

Isolation of the pheromone

The terminal two abdominal segments of 2 to 3 day old virgin females of the species *P. viteana* from 72,000 laboratory reared insects (Taschenberg, Ann. Entomol. Soc. Amer. 62, 1374–1378) were pulversized by an electronic cell disrupter in methylene chloride. The slurry filtered, and the solvent evaporated to yield some yellow oil. The bioactivity of this material was tested by impregnating small pieces of filter paper therewith and introducing the paper into small plastic olfactometer boxes (Roelofs and Feng. Ann. Entomol. Soc. Amer. 60, 1199–1203) said boxes containing males of the species. Intense activity of the males was noted after introducing the impregnated filter paper.

The aforementioned yellow oil extract was purified by chromatography on Florisil and subjected to gradient elution with eluents progressing from 100% petroleum ether through 5% diethyl ether/petroleum ether through 50% diethyl ether/petroleum ether. The principal activity was noted in the 5% diethyl ether/petroleum ether fractions and the earlier 20% diethyl ether/petroleum ether fractions The active fractions were further chormatographed on silver nitrate impregnated silica gel, elution under similar conditions with similar solvents yielded the active fractions in the latter 5% of diethyl ether and in the 20% diethyl ether fractions.

Identification of the pheromone

Saponification of the active material from the column chromatography using methanolic potassium hydroxide under reflux, destroyed biological activity, which, however, was restored by acetylation with acetylchloride. Biologic activity was similarly destroyed by hydrogenation in methanol over 5% palladium on carbon catalyst, and by halogenation of the active material using bromine in carbon tetrachloride.

Ozonolysis of purified pheromone obtained from double gas/liquid chromatography of the liquid chromatography purified material by the method of Beroza and Bierle (Anal. Chem. 38, 1976–1977) yielded a product having the same retention time on polar and non-polar substrates as 9-acetoxynonanal.

The material is thus identified as having one double bond located at the ninth carbon atom of a hydrocarbon chain having an acetoxy group attached to the first carbon atom thereof. The active material was then run by thin layer chromatography on silver nitrate impregnated silica gel and found to run at the same rate as cis-7-dodecenyl acetate, thus, giving a tentative identification of the material as cis-9-dodecenyl acetate. (The position of the double bond would not effect the rate of running on the plate, however, the cis or trans-configuration of said double bond so effects the rate of running.)

Cis-9-dodecenyl acetate is synthesized by the method disclosed in detail herein below.

The biological efficacy of the synthetic material was tested both by field test and by electro-antennograms. The electro-antennograms were run by a modification of the method and apparatus of Schneider (First Int. Simp. on Olfaction and Taste, Oxford (1963), page 85). In this test, antennae of the insect which had been prepared in the method described by Schneider and had been attached to an oscilloscope, were exposed to an air stream into which were injected 1 ml. puffs passing over a piece of filter paper saturated with a small amount of the chemical material under test. The electrical responses of the antennae were measured on the oscilloscope. By this means, it was found that by far the greatest response of electrical activity of the antennae was obtained from the natural pheromone extract and the synthetic cis-9-dodecenyl acetate.

In the field tests, Sectar ® insect traps (3M Company) were charged with the material under test and hung in fileds where the moth was prevalent. The trapping result using the pheromones under test both per se and using certain $C_8$–$C_{12}$ alkyl, alkenyl, or alkynyl acetates are set forth in detail herein below.

Among the alkyl acetates may be included octyl, nonyl, decyl, undecyl and dodecyl acetates, especially favored being nonyl acetate. The alkenyl acetates include octenyl, nonenyl, decenyl, undecenyl and dodecenyl acetates, especially preferred however is 9-decenyl acetate, it being noted that cis-9-dodecenyl acetate is excluded as an additive. The alkynyl acetates include octynyl, nonynyl, decynyl, undecynyl and dodecynyl acetates, especially preferred being the 7- and 9-dodecynyl acetates. Also useful are certain cyclic alkyl acetates such as terpinyl acetate.

It has been found that while cis-9-dodecenyl acetate per se is active at betwen 10 and 100 μg. per trap, there may be used a synergistic additive in the ratio of 2:1 to 100:1. Optimal results are obtained in the 5:1 to 15:1 ratio range, most preferably at about 10:1, then the preferred amount of attractant charge lies between about 30 and about 100μg. per trap. At ratios and charges outside these limits the results are not optimal.

The additives have no attractant effect per se. The synergistic activity of nonyl, dodecyl, 9-decenyl and terpinyl acetates is about equal. Eugenol is also a synergist, but to a lesser degree.

In view of the very small amounts of active material both per se and in the presence of a synergistic activator, it has been found convenient to handle the materials in inert, moderately volatile carriers suitably solvents such as petroleum ether, ethanol or the like. These carrier solvents will evaporate rapidly from the wick of the trap leaving the active constituents to volatalize from the trap.

METHODS OF EAG MEASUREMENT

EAG recordings are obtained from excised grape-berry moth (GBM—*P. viteana*) antenna (ca. 3 mm. long). The antennal socket is pressed against the wet surface of a wax block in a Syracuse watch glass full of insect Ringer solution. The solution was prepared from 20 g. potassium chloride, 10 g. sodium chloride, 7.5 g. calcium chloride, 0.02 g. magnesium chloride, and 0.02 g. sodium dihydrogen phosphate in 2 l. water—finally adjusted to pH 6.9. A microscope at 12X magnification is used to observe the snipping of several distal antennal segments. The cut end is brought in loose contact with the liquid surface of a glass capillary filled with Ringer. The capillary is permanently mounted with was on the input probe ($10^{12}$ ohms impedance) of an ELSA-3 (Electronics for Life Sciences, Rockville, Md.) DC preamplifier, the output of which is fed to a 200× DC amplifier and then to a Tektronix® model 564 storage oscilloscope. The probe and capillary are carried by a Narishige® MM-33 micromanipulator. Electrical contact is made between the probe and the capillary with a short piece of chloridized silver wire. The ground lead from the probe contacts another chloridized silver wire dipped into the silane of the watch glass (short leads are used to avoid picking up extraneous electrical signals). The oscilloscope trace is either photographed or measured directly. All the instruments, except the oscilloscope, are located inside a grounded Faraday cage made of ¼ in. mesh galvanized wire, which screens out extraneous electrical signals.

Air, taken from the building air supply, is filtered through fiberglass, anhydrous calcium sulphate, activated charcoal, a Koby air purifier and finally rehumidified through distilled water. The air passes through 1 cm.² glass tubing that terminates 2 cm. from the fixed antenna. Air contaminated with test chemicals is exhausted through a small hood located directly behind the working area. A short 2 mm. I.D. capillary tube is affixed through a hole in the glass tubing close to the outlet at the air stream to provide an inlet port for injection of test chemicals into the air stream.

A measured amount of test chemical, generally 80 μg., in petroleum ether is placed on 0.7 cm.² of filter paper and the paper inserted inside a Pasteur pipet after solvent evaporation. Test pipets containing chemicals with a molecular weight above 200 were found to be good for many months if stored at −20° C. between uses. The pipets, warmed to room temperature, are attached via their large end to a glass syringe equipped with a small cork adapter on the needle. A measured volume of air is drawn into the syringe before attaching the pipet. The pipet tip is inserted through the capillary inlet port in the air stream and the syringe plunger quickly depressed to pass the measured volume of air through the pipet and into the air stream as a "puff" containing test chemical. The usual injection of 1 ml. of air into an air stream of 1500 ml./sec. caused very little change in the background trace. An injection of 5 ml. of air through a blank pipet produces a maximum of 0.1 mv. deflection for normal preparations. Minor variations in the volume injected or in the duration of the air puff have little measurable effect on the size and shape of the resulting EAG. The duration of a 1 ml. air puff from a 5 ml. syringe is 30–35 milliseconds measured (by sending an air puff into a sensitive microphone and displaying the noise on an oscilloscope) and its reproducibility is good. The GMB antenna recovers to its initial state in 1 to 3 seconds after a test, as indicated by return of the trace to baseline. An interval of about 10 seconds between tests is used routinely. It should be pointed out that EAG amplitude comparisons are subject to error because some chemicals are more volatile than others and may have more molecules in each "puff." The most accurate comparisons are made between a series of positional or geometrical isomers with identical molecular weights.

An antenna from a moth anesthesized with ether displays only 80 microvolts of random noise and does not react to test chemicals. As the antenna recovers, the normal "nerve noise" due to nerve cell activity reappears (generally ca. 200 microvolts in a fresh GBM antenna preparation). Antennae of small tortricids produce much more noise than antennae of larger species of moths, although it is still possible to record a 100 microvolt response since the noise is a mixture of high frequencies than the signal. Washing GBM antennae with Beadle-Ephrussi saline or Ringer's for as long as 30 minutes has no marked effect on the EAG amplitude if the antenna is rinsed with distilled water, blotted and dried one minute before being excised and tested.

EAG results

The following table shows the average EAG responses for various dodecenyl acetate isomers. It should be noted that while wide variations in between ca. 2.0 and 4.5 mv. may occur between different antennae, the relative responses of a given antenna to various compounds passed over it remain constant.

TABLE I

| Dodecenyl acetate isomers: | EAG m.v. |
|---|---|
| Trans-7 | 0.9 |
| Trans-8 | 1.2 |
| Trans-9 | 2.3 |
| Trans-10 | 1.1 |
| Trans-11 | 1.2 |
| Cis-5 | 0.7 |
| Cis-6 | 0.8 |
| Cis-7 | 1.1 |
| Cis-8 | 1.0 |
| Cis-9 | [1] 2.7 |
| Cis-10 | 1.4 |

[1] "Sticky," tenacious.

Field trapping tests

Cis-9-dodecenyl acetate was placed in a standard trap, in a field infested with *P. viteana*. The amount of attractant was varied. In other traps in the same general locale, the traps were charged with the attractant and a synergist.

| | Ratio | μg. cis-dodecenyl acetate | Number of GBM trapped |
|---|---|---|---|
| Synergist dodecyl acetate | 0:1 | 30 | 1 |
| | | 100 | 1 |
| | | 500 | 0 |
| Do | 2:1 | 30 | 3 |
| | | 100 | 3 |
| | | 500 | 1 |
| Do | 10:1 | 30 | 12 |
| | | 100 | 10 |
| | | 500 | 3 |
| Do | 25:1 | 30 | 4 |
| | | 100 | 4 |
| | | 500 | 6 |
| Do | 50:1 | 30 | 4 |
| | | 100 | 3 |
| | | 500 | 1 |
| Do | 100:1 | 30 | 4 |
| | | 100 | 6 |
| | | 500 | 6 |

(b) The same experiment was carried out in a different locale using different synergists, using 1000 μg. of synergist and 100 μg. of cis-9-dodecenyl acetate (i.e. 10:1 ratio).

| Synergist: | GBM trapped |
|---|---|
| 9-decenyl acetate | 40 |
| Nonyl acetate | 66 |
| Terpinyl acetate | 50 |
| Dodecyl acetate | 50 |
| Eugenol | 25 |
| 8-propyl octanyl acetate | 2 |

SYNTHESIS OF CIS-9-DODECENYL ACETATE

8-bromo-1-octanol

A mixture of 1,8-octanediol (77.0 g. 0.53 mole, Aldrich, M.P. 58–61°), 48% hydrogen bromide (300 ml.) and water (40 ml.) was extracted continuously for 5 hours at room temperature then overnight at 90° with ligroin (D 0.67–6.69; Eastman practical grade) mixed with potassium carbonate (8 g.) in the collection flask. The ligroin solution was filtered and evaporated to yield 118 g. of a material that contained about 25% 1,8-dibromooctane and 75% of 8-bromo-1-octanol (estimated from the gas chromatogram).

The dibromide was removed by filtration in petroleum ether (30–60°) solution through Florisil®. The 8-bromo-1-octanol was removered by elution from the Florisil with 95% ethanol. Evaporation of the solvents yielded 1,8-dibromooctane (26 g.) and 8-bromo-1-octanol (91 g.; 83% yield). The gas chromatogram (Hi-Eff column) of 8-bromo-1-octanol showed it to be free of dibromide and other contaminants, so the preparation was used without further purification.

2[(8-bromooctyl)oxy] tetrahydropyran 8-bromo-1-octanol (78 g., 0.37 mole), molecular sieve 4A (about 10 g.) and conc. sulfuric acid (3 drops) were mixed and cooled in an ice-water bath. 3,4-dihydropyran (37.5 g., 0.45 mole, Eastman practical grade) was added slowly. After about 1 hour, solid sodium bicarbonate (about 5 g.) was added and the mixture was stirred for 1 hour. The mixture was diluted with petroleum ether (30–60°) and washed thoroughly with aqueous sodium bicarbonate, then twice with aqueous sodium chloride. Filtration through a pledget of anhydrous sodium sulfate and removal of most of the solvent yielded 2[(8-bromooctyl)oxy]tetrahydropyran; 119 g. (theoretical yield =109 g.). The gas chromatogram of this preparation showed that it may have contained about 10% of 8-bromo-1-octanol. This preparation was used in the next reaction without further purification.

2(9-decynyloxy)tetrahydropyran

Dimethyl sulfoxide was distilled under vacuum (water pump; about 15 mm. Hg) and stored over molecular sieve 4A until used. Lithium acetylide stabilized with ethylene diamine (37.7 g., 0.41 mole) was added to dry dimethyl sulfoxide (250 ml.) under dry nitrogen and the mixture was cooled in an ice-water bath. 2[(8-bromooctyl)oxy] tetrahydropyran (113 g., crude preparation, <0.37 mole) in dry dimethyl sulfoxide (75 ml.) was added slowly to the stirred mixture, which was then allowed to warm to room temperature and stirred overnight under dry nitrogen. The reaction mixture was poured over ice and extracted three times with petroleum ether (30–60°). The combined extracts were washed repeatedly with aqueous sodium chloride until neutral, filtered through a pledget of anhydrous sodium sulfate and the solvent was evaporated. Distillation of the residue yielded 81.2 g. (87%) of 2(9-decynyloxy) tetrahydropyran; B.P. 115–120° at 0.2–.5 mm. Hg; IR, 3325 and 2130 cm.$^{-1}$; g.c. (Hi-Eff column) shows one major component with several minor components comprising >5% of the total mixture.

2(9-dodecynyloxy) tetrahydropyran

2(9-decynyloxy) tetrahydropyran (40 g., 0.17 mole) in dry ether (100 ml.) was added to an efficiently stirred mixture of lithium amide (15 g., 0.65 mole) in liquid ammonia (~0.5 l.) under nitrogen. One hour later bromoethane (27 g., 0.25 mole; Eastman white label) in dry ether (50 ml.) was aded and the mixture was allowed to reflux under nitrogen for 3-4 hours, then was left overnight at room temperature. Ice and water were added and the mixture was extracted three times with petroleum ether (30-60°), the combined petroleum ether extracts were washed five times with aqueous sodium chloride, filtered through a pledget of anhydrous sodium sulfate and evaporated to yield crude 2(9-dodecynyloxy) tetrahydropyran (45 g.), which was used directly in the next reaction. IR showed no H—C≡C bands at 3325 and 2130 cm.$^{-1}$; g.c. (Hi-Eff column), showed one major component with two minor components comprising ~5% of the total mixture.

2(cis-9-dodecenyloxy) tetrahydropyran

5% palladium on calcium carbonate (0.4 g.), quinoline (3 drops) and 95% ethanol (50 ml.) were mixed and placed under hydrogen at ~1 atmosphere. After the catalyst turned black, 2 - (9 - dodecynyloxy) tetrahydropyran (11.1 g., 0.042 mole) was injected into the reaction flask. Hydrogen uptake (1,000 ml.; theoretical=1,010 ml.) ceased after 10 min. Filtration and evaporation yielded crude 2(cis-9-dodecenyloxy) tetrahydropyran; 10.8 g. (97% yield); IR, 3030 cm.$^{-1}$, g.c., showed one major component and two minor components comprising ~5% of the total mixture.

Cis-9-dodecenyl acetate

Crude 2(cis-9-dodecenyl) (10.8 g., 0.040 mole), glacial acetic acid (50 ml.), and acetyl chloride (12 ml.) were mixed and kept at reflux overnight. After cooling, the reaction mixture was poured over ice, diluted with water, and extracted three times with petroleum ether (30-60°). The combined extracts were washed three times with aqueous sodium bicarbonate, then twice with aqueous sodium chloride, filtered through a pledget of anhydrous sodium sulfate and evaporated. The residue was distilled under vacuum to obtain purified cis-9-dodecenyl acetate, 7.0 g. (77%, overall yield from 1,8-octanediol, 56%); B.P. 88-94° at 1 mm. Hg; IR, 3030, 1740 cm.$^{-1}$, and a small peak at 975 cm.$^{-1}$ indicating ~6% of the trans isomer; g.c., showed >1% of impurity was left, retention of cis-9-dodecenyl acetate on Hi-Eff at 159°, relative to dodecyl acetate, 1.19.

We claim:

1. A method of attracting and trapping male moths of the species *Paralobesia viteana* which comprises exposing said moths to an insect trap charged with between about 10 and about 100 µg. of cis-9-dodecenyl acetate.

2. The method according to claim 1 wherein the trap is additionally charged with a synergistic additive selected from the group consisting of eugenol, an alkyl acetate, an alkenyl acetate, an alkynyl acetate and a cycloalkyl acetate having 8 to 12 carbon atoms in the alkyl, alkenyl or alkynyl moieties, provided that where the additive is a $C_{12}$ alkenyl acetate it is other than cis - 9 - dodecenyl acetate, wherein the ratio of additive to cis-9-dodecenyl acetate is from about 2:1 to about 50:1.

3. A method according to claim 2 wherein the additive is selected from the group consisting of nonyl acetate, decyl acetate, dodecyl acetate, 9-decenyl acetate, and terpinyl acetate.

4. A method according to claim 2 wherein the ratio of additive to cis-9-dodecenyl acetate is from about 5:1 to about 15:1.

5. A method according to claim 2 wherein the charge of cis-9-dodecenyl acetate is between about 30 and about 100 µg.

6. A method according to claim 5 wherein the ratio of additive to cis-9-dodecenyl acetate is between about 5:1 and about 15:1.

7. A method according to claim 6 wherein the ratio of additive to cis-9-dodecenyl acetate is about 10:1 and the additive is nonyl acetate.

8. An attractant composition for male moths of the species *Paralobesia viteana* which comprises a mixture of cis - 9 - dodecenyl acetate and a synergistic additive selected from the group consisting of eugenol, an alkyl acetate, an alkenyl acetate, an alkynyl acetate and a cycloalkyl acetate wherein the alkyl, alkenyl or alkynyl moiety contains 8 to 12 carbon atoms, provided that where the additive is a $C_{12}$ alkenyl acetate, it is other than cis-9-dodecenyl acetate, wherein the ratio of additive to cis-9-dodecenyl acetate is from about 2:1 to about 50:1.

9. A composition according to claim 8 wherein the additive is selected from the group consisting of nonyl acetate, decyl acetate, dodecyl acetate, 9-decenyl acetate and terpinyl acetate.

10. A composition according to claim 8 wherein the ratio of additive to cis-9-dodecenyl acetate is between about 5:1 and about 15:1.

References Cited

UNITED STATES PATENTS 3,586,712   6/1971   Green et al. _____ 424—84 X

OTHER REFERENCES

Chemical Abstracts, vol. 41, 7055c, 1947.
Chemical Abstracts, vol. 52, 8444e, 1958.
Chemical Abstracts, vol. 55, 27673g, 1961.
Roelofs et al.: Annals of The Entomological Soc. of Amer., vol. 60, No. 6, pp. 1199-1203, 1967.

ALBERT T. MEYERS, Primary Examiner
D. ROBINSON, Assistant Examiner

U.S. Cl. X.R.
424—18